United States Patent
Yamamoto et al.

(10) Patent No.: US 10,938,070 B2
(45) Date of Patent: Mar. 2, 2021

(54) NON-AQUEOUS ELECTROLYTE SOLUTION FOR RECHARGEABLE BATTERY, RECHARGEABLE BATTERY HAVING THE SAME AND METHOD OF PREPARING THE SAME

(71) Applicant: SAMSUNG SDI CO., LTD., Yongin-si (KR)

(72) Inventors: Hidekazu Yamamoto, Yokohama (JP); Tomonobu Mizumo, Yokohama (JP); Kenichi Kawase, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 31 days.

(21) Appl. No.: 16/279,894

(22) Filed: Feb. 19, 2019

(65) Prior Publication Data

US 2019/0260083 A1 Aug. 22, 2019

(30) Foreign Application Priority Data

Feb. 20, 2018 (JP) .............................. JP2018-028127
Aug. 29, 2018 (KR) ......................... 10-2018-0102159

(51) Int. Cl.
*H01M 4/02* (2006.01)
*H01M 10/0569* (2010.01)
*H01M 10/0525* (2010.01)

(52) U.S. Cl.
CPC ... *H01M 10/0569* (2013.01); *H01M 10/0525* (2013.01); *H01M 2300/0034* (2013.01); *H01M 2300/0037* (2013.01)

(58) Field of Classification Search
CPC ..................................................... H01M 4/02
See application file for complete search history.

(56) References Cited

U.S. PATENT DOCUMENTS

2002/0172859 A1   11/2002   Roh et al.
2009/0104537 A1   4/2009    Deschamps
(Continued)

FOREIGN PATENT DOCUMENTS

JP    5079523 B2      11/2012
JP    2013-534511 A   9/2013
(Continued)

OTHER PUBLICATIONS

Wang, et al., "Superconcentrated electrolytes for a high-voltage lithium-ion battery", Nature Communications, 2016, 7,12032, 9 pages.
(Continued)

*Primary Examiner* — Jacob B Marks
(74) *Attorney, Agent, or Firm* — Lewis Roca Rothgerber Christie LLP

(57) ABSTRACT

An electrolyte solution, a rechargeable battery including the same and a method of preparing the same are provided. The electrolyte solution includes an electrolytic salt having a concentration of greater than or equal to about 2.0 M (mol/L) and less than or equal to about 5.0 M (mol/L) with respect to the electrolyte solution and a cyclic carbonate-containing solvent. The cyclic carbonate-containing solvent includes a base solvent and a cyclic carbonate. The cyclic carbonate is included in an amount of about 1 volume % to about 15 volume % based on a total volume of the base solvent and the cyclic carbonate. The cyclic carbonate-containing solvent includes a coordination solvent coordinated with an ionized ion from the electrolytic salt and a free solvent that is not coordinated with an ionized ion from the electrolytic salt, and a peak area ratio of the free solvent is from about 1% to about 25%.

11 Claims, 2 Drawing Sheets

(56) References Cited

U.S. PATENT DOCUMENTS

| | | |
|---|---|---|
| 2011/0020700 A1 | 1/2011 | Iwaya |
| 2011/0151317 A1 | 6/2011 | Giroud et al. |
| 2013/0022879 A1 | 1/2013 | Yamamoto et al. |
| 2013/0108933 A1 | 5/2013 | Garcia-Juan et al. |
| 2015/0249269 A1 | 9/2015 | Yoon et al. |
| 2017/0214091 A1 | 7/2017 | Abe et al. |
| 2017/0331158 A1* | 11/2017 | Jito ................. H01M 4/131 |

FOREIGN PATENT DOCUMENTS

| | | |
|---|---|---|
| JP | 5605221 B2 | 10/2014 |
| JP | 2014-241198 A | 12/2014 |
| JP | 2015-079636 * | 4/2015 |
| JP | 5727372 B2 | 6/2015 |
| JP | 5806660 B2 | 11/2015 |
| WO | WO 2011-142276 A1 | 11/2011 |
| WO | WO2016/017809 A1 | 2/2016 |

OTHER PUBLICATIONS

Korean Office Action dated Nov. 23, 2020, issued in corresponding Korean Patent Application No. 10-2018-0102159 (4 pages).

* cited by examiner

NON-AQUEOUS ELECTROLYTE SOLUTION FOR RECHARGEABLE BATTERY, RECHARGEABLE BATTERY HAVING THE SAME AND METHOD OF PREPARING THE SAME

CROSS-REFERENCE TO RELATED APPLICATION

This application claims priority to and the benefit of Japanese Patent Application No. 2018-028127, filed in the Japan Patent Office on Feb. 20, 2018; and Korean Patent Application No. 10-2018-0102159, filed in the Korean Intellectual Property Office on Aug. 29, 2018, the entire contents of both of which are incorporated herein by reference.

BACKGROUND

1. Field

The present disclosure relates to an electrolyte solution for a non-aqueous electrolyte rechargeable battery and a non-aqueous electrolyte rechargeable battery.

2. Description of the Related Art

A non-aqueous electrolyte rechargeable battery such as a rechargeable lithium ion battery is widely used as a power source for portable devices such as a notebook PC (note PC) and a mobile phone. In addition, the rechargeable lithium ion battery has drawn attention as a power source suitable for xEV such as an electric vehicle and a hybrid electric vehicle. A rechargeable lithium ion battery suitable for xEV should have a high capacity and a long cycle-life because of the need to ensure performance equivalent to that of a related art gasoline engine automobile. Also, a rechargeable lithium ion battery suitable for xEV should have rapid charging characteristics (high-rate charging/discharging) for completing charging within a time equivalent to a fueling time of gasoline engine cars.

SUMMARY

Recently, there is a need for a new performance improvement of a non-aqueous electrolyte rechargeable battery, and, as a result, there are studies being conducted on how to increase an electrolytic salt (or electrolyte salt) concentration in the electrolyte solution. As a way of increasing a lithium salt concentration, there is a method of coordinating most of the solvents of the electrolyte solution with ions. That is, a concentration of a free solvent (i.e., a solvent that does not coordinate with ions of the electrolyte solution) is reduced. As a result, the electrochemical stability of the electrolyte solution may be improved. However, if an electrolytic salt concentration is simply increased, viscosity of the electrolyte solution is increased and thus cycle-life may be deteriorated. Accordingly, aspects of embodiments of the present invention are directed toward an electrolyte solution for a non-aqueous electrolyte rechargeable battery and a rechargeable lithium ion battery in which viscosity of the electrolyte solution is decreased while maintaining a concentration of a free solvent of the electrolyte solution at a low level.

An embodiment provides a non-aqueous electrolyte solution for a rechargeable battery, including an electrolytic salt having a concentration of greater than or equal to about 2.0 M (mol/L) and less than or equal to about 5.0 M (mol/L) with respect to the electrolyte solution and a cyclic carbonate-containing solvent, wherein the cyclic carbonate-containing solvent includes a base solvent and a cyclic carbonate, wherein the cyclic carbonate is included in an amount of about 1 volume % to about 15 volume % based on a total volume of the base solvent and the cyclic carbonate, the cyclic carbonate-containing solvent includes a coordination solvent coordinated with an ionized ion from the electrolytic salt and a free solvent that is not coordinated with an ionized ion from the electrolytic salt, and the free solvent has a peak area ratio of the free solvent determined by a Raman spectrum that is greater than or equal to about 1% and less than or equal to about 25%.

The peak area ratio of the free solvent is a ratio of a peak area of the free solvent relative to a total area of a peak area of the free solvent and a peak area of the coordination solvent determined by the Raman spectrum, and the peak area is an area under a peak separated by a peak separation treatment and a set or predetermined baseline.

Accordingly, the electrolytic salt concentration may be greater than or equal to about 2.3 M (mol/L) and less than or equal to about 3.0 M (mol/L).

The cyclic carbonate may include at least one selected from ethylene carbonate (EC), vinylene carbonate (VC), and fluoroethylene carbonate (FEC).

The electrolyte solution may include a poor solvent having a solubility with respect to an electrolytic salt of less than or equal to about 1 g, and the poor solvent may include at least one selected from trifluorotoluene ($CF_3Ph$) and fluorobenzene (FB).

The electrolytic salt may include a lithium salt.

Another embodiment provides a non-aqueous electrolyte rechargeable battery including the electrolyte solution for the non-aqueous electrolyte rechargeable battery.

According to embodiments of the present invention, the concentration of the free solvent of the electrolyte solution and viscosity of the electrolyte solution are maintained to be low and cycle-life of the rechargeable battery may be improved.

DETAILED DESCRIPTION

Figure 1:
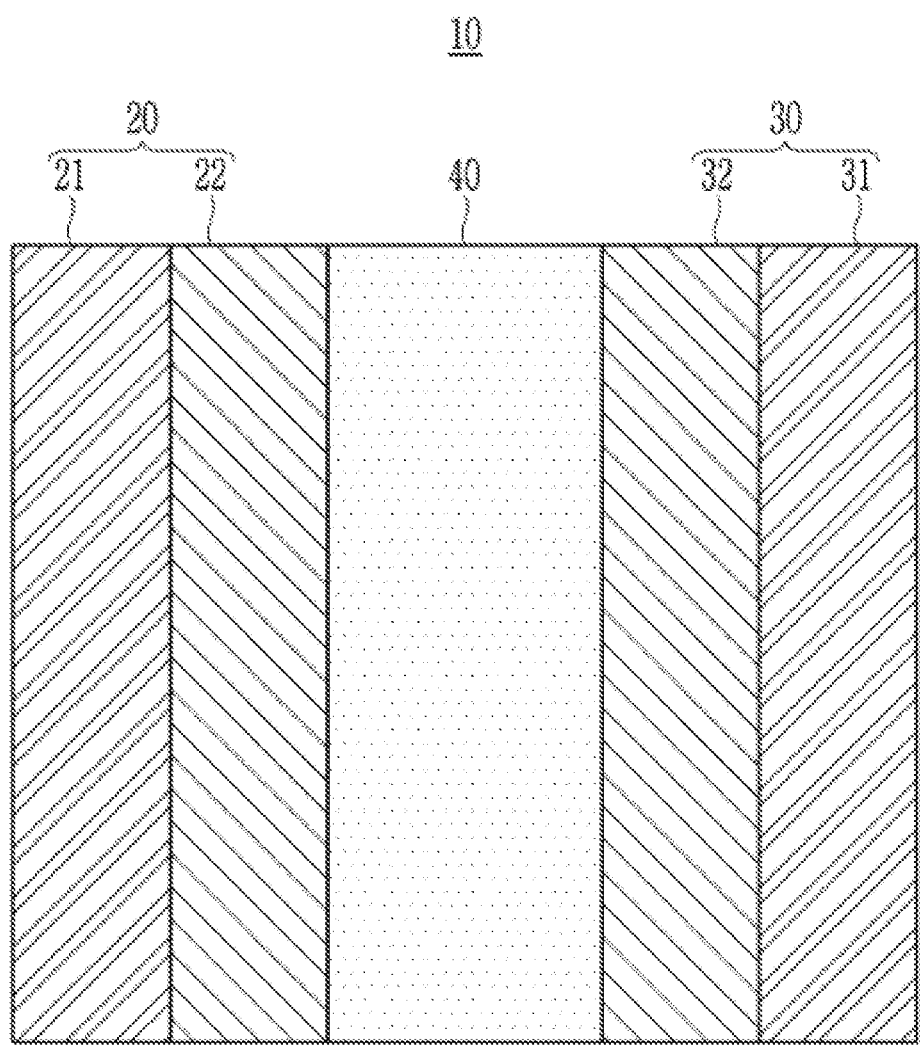
FIG. 1 is a cross sectional side view showing a configuration of a rechargeable lithium ion battery.

Embodiments of the present invention will be described in more detail with reference to the accompanying drawings. In the description and drawings, constituent elements having substantially the same functional constitution may be denoted by like reference numerals, and redundant description may not be provided.

Configuration of Rechargeable Lithium Ion Battery

First, referring to FIG. 1, a configuration of a rechargeable lithium ion battery 10 according to an embodiment of the present invention is described.

The rechargeable lithium ion battery 10 includes a positive electrode 20, a negative electrode 30, a separator 40, and a cyclic carbonate-containing electrolyte solution (non-aqueous electrolyte solution). The rechargeable lithium ion battery 10 has a charge-reaching voltage (an oxidation reduction potential) of, for example, greater than or equal to about 4.0 V (vs. Li/Li+) and less than or equal to about 5.0 V, particularly greater than or equal to about 4.2 V and less than or equal to about 5.0 V. The shape of the rechargeable lithium ion battery 10 is not particularly limited, and, specifically, the rechargeable lithium ion battery 10 may have any suitable cylindrical, prismatic, laminate-type, and/or button-type shape.

Positive Electrode

The positive electrode 20 includes a positive current collector 21 and a positive active material layer 22.

The positive current collector 21 may use any conductor without particular limit. The positive current collector 21 may include, for example, aluminum, stainless steel, and nickel-plated (nickel-coated) steel.

The positive active material layer 22 includes a positive active material and may include a conductive agent and/or a binder for a positive electrode. The positive active material may be, for example, lithium-containing solid solution oxide, and may be any material that can electrochemically intercalate and deintercalate lithium ions without particular limitation.

The solid solution oxide may be, for example, $Li_aMn_xCo_yNi_zO_2$ ($1.150 \leq a \leq 1.430$, $0.45 \leq x \leq 0.6$, $0.10 \leq y \leq 0.15$, $0.20 \leq z \leq 0.28$), $LiMn_xCo_yNi_zO_2$ ($0.3 \leq x \leq 0.85$, $0.10 \leq y \leq 0.3$, $0.10 \leq z \leq 0.3$), or $LiMn_{1.5}Ni_{0.5}O_4$.

The conductive agent may include, for example, at least one of carbon black (such as Ketjenblack, acetylene black, and the like), natural graphite, artificial graphite, carbon nanotubes, graphene, fiber-type carbons (such as carbon nanofibers), and the like, and a composite of the fiber-type carbons and the carbon black. The conductive agent is not particularly limited as long as it increases conductivity of the positive electrode.

Non-limiting examples of the binder for the positive electrode may be polyvinylidene fluoride, ethylene-propylene-diene terpolymer, a styrene butadiene rubber, an acrylonitrile butadiene rubber, a fluororubber, polyvinyl acetate, polymethyl methacrylate, polyethylene, nitrocellulose, and the like. The binder is not particularly limited as long as it binds the positive active material and the conductive agent with the positive current collector 21.

The positive active material layer 22 is manufactured, for example, using the following method. First, a positive electrode mixture is manufactured by dry-mixing the positive active material, the conductive agent, and the binder for the positive electrode. Subsequently, the positive electrode mixture is dispersed in an appropriate organic solvent to form a positive electrode mixture slurry, and the positive electrode mixture slurry is coated on the current collector 21, dried, and compressed to form a positive active material layer.

Negative Electrode

The negative electrode 30 includes a negative current collector 31 and a negative active material layer 32.

The negative current collector 31 may use any suitable conductor. The negative active material layer 32 includes a negative active material and may include a conductive agent and a binder. An amount ratio of the negative active material, the conductive agent, and the binder is not particularly limited, and may be any amount ratio that may be used in a general rechargeable lithium ion battery.

Non-limiting examples of the negative active material may be a graphite-based active material, a silicon (Si) and/or tin (Sn)-based active material, a titanium oxide (TiOx) active material, and the like. The negative electrode active material is not particularly limited as long as it is a material capable of electrochemically intercalating and deintercalating lithium ions. The graphite-based active material may be artificial graphite, natural graphite, a mixture of artificial graphite and natural graphite, and/or natural graphite coated with artificial graphite. The silicon or tin-based active material may be fine particulates of silicon and/or tin, fine particulates of an oxide of silicon or tin, an alloy of silicon and/or tin, and/or the like. The titanium oxide active material may be $Li_4Ti_5O_{12}$, and/or the like. In addition, the negative active material may be metal lithium (Li).

The conductive agent may be the same as the conductive agent used in the positive active material layer 22.

The binder for the negative electrode may be, for example, polyvinylidene difluoride, an ethylenepropylene diene terpolymer, a styrene-butadiene rubber (SBR), an acrylonitrile-butadiene rubber, a fluororubber, polyvinyl acetate, polymethyl methacrylate, polyethylene, nitrocellulose, and/or the like. On the other hand, the binder for the negative electrode is not particularly limited as long as it binds the negative active material and the conductive agent on the negative current collector 31. In addition, an amount of the binder for the negative electrode is not particularly limited and may be any amount that is applied to a negative active material layer of a rechargeable lithium ion battery.

Separator

The separator 40 is not particularly limited and may be any separator in any suitable rechargeable lithium ion battery.

The separator 40 may include a porous layer and/or a non-woven fabric having excellent high-rate discharge performance, which may be used alone or in a mixture thereof. Non-limiting examples of the resin of the separator 40 may be a polyolefin-based resin such as polyethylene or polypropylene, a polyester-based resin such as polyethylene terephthalate or polybutylene terephthalate, polyvinylidene fluoride (PVDF), a vinylidene fluoride (VDF)-hexafluoro propylene (HFP) copolymer, a vinylidene fluoride-perfluorovinylether copolymer, a vinylidene fluoride-tetrafluoroethylene copolymer, a vinylidene fluoride-trifluoro ethylene copolymer, a vinylidene fluoride-fluoroethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, and the like.

Cyclic Carbonate-Containing Electrolyte Solution (Non-Aqueous Electrolyte Solution for a Rechargeable Battery)

Next, a configuration of the cyclic carbonate-containing electrolyte solution is described. The cyclic carbonate-containing electrolyte solution includes an electrolytic salt (or electrolyte salt) having an electrolytic salt concentration of greater than or equal to about 2.0 M (mol/L) and less than or equal to about 5.0 M (mol/L), and a cyclic carbonate-containing solvent. The cyclic carbonate-containing solvent includes a base solvent and cyclic carbonate in which the electrolytic salt is dissolved. The cyclic carbonate-containing solvent may be classified into a coordination solvent coordinated with ionized ions (e.g., lithium ions) from the electrolytic salt and a free solvent that is not coordinated with an ionized ion from the electrolytic salt. Herein, the base solvent and the cyclic carbonate dissolve the electrolytic salt. Therefore, the base solvent may include a free solvent (free base solvent) and a coordination solvent (coordination base solvent) and the cyclic carbonate may include a free solvent (free cyclic carbonate) and a coordination solvent (coordination cyclic carbonate).

Figure 2:
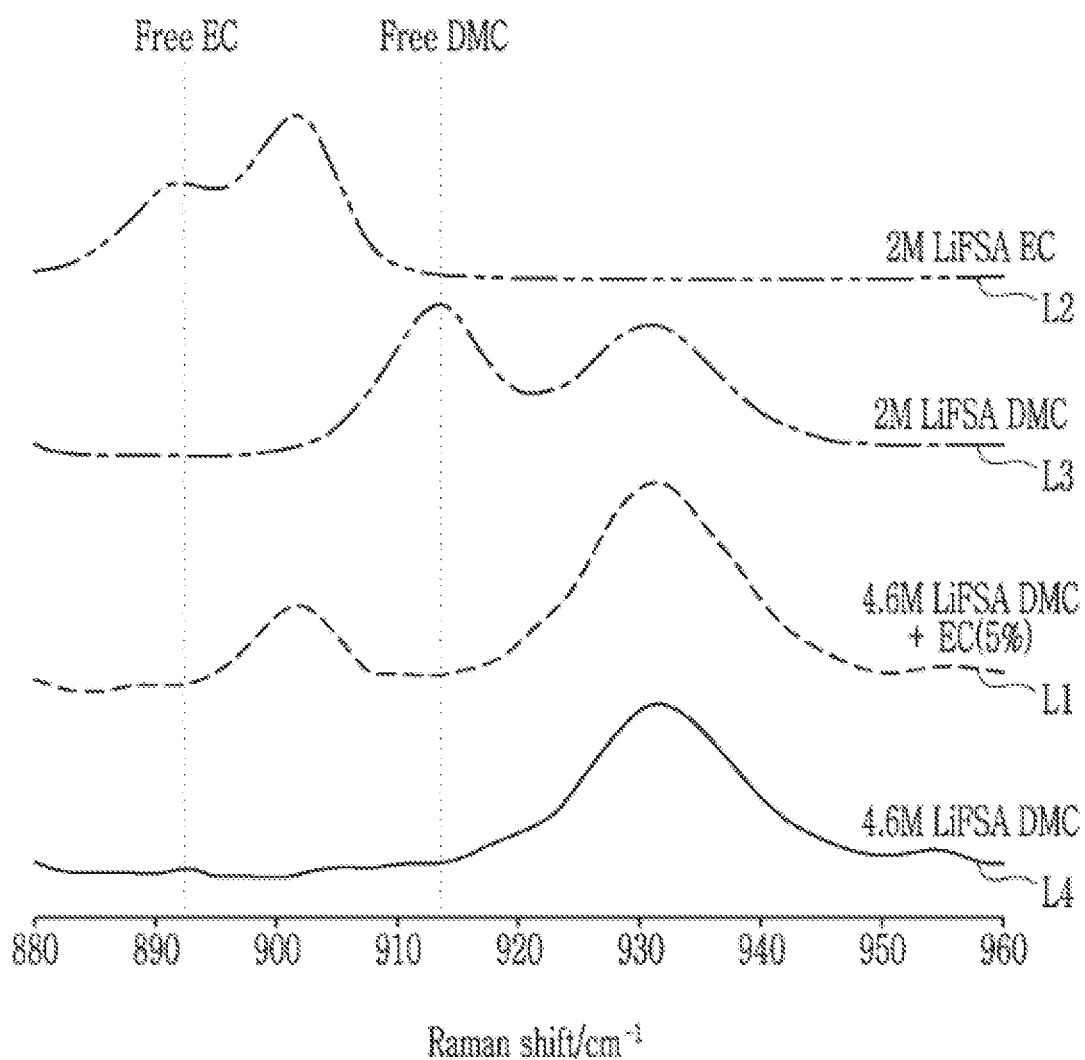
FIG. 2 is a graph showing Raman spectra of electrolyte solutions having various compositions.

Referring to FIG. 2, the cyclic carbonate-containing electrolyte solution according to the present embodiment is described in more detail.

As described above, increasing the electrolytic salt concentration of the electrolyte solution in order to improve performance of the rechargeable lithium ion battery 10 has been envisioned. The increase of the electrolytic salt concentration in the electrolyte solution may decrease a free solvent concentration in the electrolyte solution and, furthermore, improve electrochemical stability of the electrolyte solution. However, a simple increase of the electrolytic salt concentration may deteriorate the conductivity of the electrolyte solution and thus reduce the cycle-life. Accordingly, as a result of examining technology that increases the conductivity of the electrolyte solution, while the free solvent concentration in the electrolyte solution is maintained, a method of adding cyclic carbonate to the electrolyte solution in which electrolytic salt at a high concentration is dissolved in a base solvent has been envisioned. The cyclic carbonate has high affinity for ionized cations and, particularly, lithium ions in the electrolytic salt. In other words, the lithium ions coordinated with the cyclic carbonate may smoothly move along the electrolyte solution and thus improve the conductivity of the electrolyte solution.

However, since the cyclic carbonate may increase the viscosity of the electrolyte solution, when the cyclic carbonate is added thereto in an excessive amount, the viscosity of the electrolyte solution is increased, and thus the cycle-life may be deteriorated. Accordingly, an appropriate amount of the cyclic carbonate may be in a range of greater than or equal to about 1 volume % and less than or equal to about 15 volume % based on a total volume of the base solvent and the cyclic carbonate. Accordingly, the cyclic carbonate-containing solvent according to the present embodiment may include the cyclic carbonate in a range of greater than or equal to about 1 volume % and less than or equal to about 15 volume %, for example, in a range of greater than or equal to about 3 volume % and less than or equal to about 10 volume % based on a total volume of the cyclic carbonate-containing solvent.

As described above, it is also important to lower a free solvent concentration. The free solvent concentration of the electrolyte solution may be determined by a Raman spectrum. Referring to FIG. 2, a method of determining the free solvent concentration by the Raman spectrum is described.

Graph L1 illustrates a Raman spectrum of the cyclic carbonate-containing electrolyte solution according to the present embodiment. The electrolyte solution of Graph L1 includes LiFSA as an electrolytic salt, dimethyl carbonate (DMC) as a base solvent, and ethylene carbonate (EC) as a cyclic carbonate. A concentration of LiFSA may be 4.6 M (mol/L), and an additional amount of the cyclic carbonate is 5 volume % based on a total volume of the cyclic carbonate-containing solvent. Graph L2 illustrates a Raman spectrum of an electrolyte solution in which LiFSA is dissolved in ethylene carbonate at a concentration of 2.0 M (mol/L). Graph L3 illustrates a Raman spectrum of an electrolyte in which 2.0 M (mol/L) of LiFSA is dissolved in dimethyl carbonate. Graph L4 illustrates a Raman spectrum of an electrolyte in which 4.6 M (mol/L) LiFSA is dissolved in dimethyl carbonate.

A peak based on an O—$CH_3$ stretching vibration of the dimethyl carbonate molecule is observed at different positions depending on a state of the dimethyl carbonate. In addition, a peak based on an O—$CH_3$ stretching vibration of the ethylene carbonate molecule is observed at different positions depending on a state of the ethylene carbonate.

First, Graph L2 is examined. In Graph L2, each peak is observed before and after about 895 $cm^{-1}$ and before and after about 905 $cm^{-1}$. When a Raman spectrum of a solvent only including (e.g., consisting of) ethylene carbonate is measured, a peak is observed only before and after about 895 $cm^{-1}$, but because ethylene carbonate is present only as a free solvent in the solvent only including (e.g., consisting of) ethylene carbonate, the peak before and after about 895 $cm^{-1}$ corresponds to a free solvent (a so-called free EC), and a peak before and after about 905 $cm^{-1}$ corresponds to a coordinate solvent (a so-called coordinate EC).

Next, Graph L3 is examined. In Graph L3, each peak is observed before and after about 910 $cm^{-1}$ and in a range of greater than or equal to about 930 $cm^{-1}$ and less than or equal to about 935 $cm^{-1}$. Herein, the peak before and after about 910 $cm^{-1}$ corresponds to a free solvent (a so-called free DMC), and the peak in the range of greater than or equal to about 930 $cm^{-1}$ and less than or equal to about 935 $cm^{-1}$ corresponds to a coordinate solvent (a so-called coordinate DMC).

Graph L4 shows a higher LiFSA concentration than Graph L3. In other words, Graph L4 shows a lower free solvent concentration. Accordingly, a peak corresponding to a coordinate solvent is observed, but a peak corresponding to a free solvent is very small (e.g., almost not observed).

Subsequently, Graph L1 is examined. In Graph L1, each peak corresponding to ethylene carbonate and dimethyl carbonate is observed. However, a peak corresponding to a coordinate solvent (i.e., coordinate EC, coordinate DMC) is observed due to a high LiFSA concentration, but a peak corresponding to a free solvent (i.e., free EC, free DMC) is very small (e.g., almost not observed).

In any case, Raman spectra of the electrolyte solutions show a peak corresponding to a coordinate solvent and a peak corresponding to a free solvent. Accordingly, each peak may be separated by peak-treating the Raman spectra, and, then, peak intensity of the peak may be specified. When a free solvent concentration is low, the intensity of the peak corresponding to the free solvent becomes small. Accordingly, the free solvent concentration is specified according to a peak area ratio of the free solvent. In other words, a peak area of the free solvent determined by a Raman spectrum and a peak area of the coordination solvent determined by a Raman spectrum are calculated. The peak area refers to an area under a peak separated by a peak separation treatment and a set or predetermined baseline. Then, a ratio of a peak area of the free solvent relative to a total area of a peak area of the free solvent and a peak area of the coordination solvent is calculated (as the peak area ratio of the free solvent).

Herein, the cyclic carbonate-containing electrolyte solution according to the present embodiment includes a base solvent and a cyclic carbonate. The base solvent may include at least either one of the free solvent and the coordinate solvent, and the cyclic carbonate may also include at least either one of the free solvent and the coordinate solvent. In other words, a peak area ratio of the free solvent relative to the base solvent and to the cyclic carbonate, respectively, can be specified. Accordingly, the peak area ratio according to the present embodiment is calculated according to Equation 1.

Equation 1

$$A0\_all = \{[A0\_base/(A0\_base + Ac\_base)] \times V\_base \times 100\} + \{[A0\_CC/(A0\_CC + Ac\_CC)] \times V\_CC \times 100\} \quad (1)$$

In Equation 1, A0_all is a peak area ratio of the entire free solvent. A0_base is a peak area of the free base solvent, and Ac_base is a peak area of an ion-coordinate base solvent. V_base is volume % of a base solvent based on a total volume of a cyclic carbonate-containing solvent. A0_CC is a peak area of free cyclic carbonate, and Ac_CC is a peak area of ion-coordinate cyclic carbonate. V_CC is volume % of cyclic carbonate based on a total volume of the cyclic carbonate-containing solvent.

In the present embodiment, a peak area ratio of the entire free solvent may be in a range of greater than or equal to about 1% and less than or equal to about 25%, for example, greater than or equal to about 3% and less than or equal to about 20%.

Next, a specific composition of the cyclic carbonate-containing electrolyte solution according to the present embodiment is explained. The electrolytic salt may be any electrolytic salt used in a related art lithium ion battery without particular limit. For example, it may be an inorganic ion salt including lithium (Li), sodium (Na), and/or potassium (K), such as $LiN(SO_2F)_2$ LiFSA (lithium bisfluoro sulfonyl amide), LiFSI (lithium bisfluoro sulfonyl imide), $LiClO_4$, $LiBF_4$, $LiAsF_6$, $LiPF_6$, $LiPF_{6-x}(CnF_{2n+1})_x$ [wherein, $1<x<6$, and n=1 or 2], LiSCN, LiBr, LiI, $Li_2SO_4$, $NaClO_4$, NaI, NaSCN, NaBr, $KClO_4$, KSCN, and/or the like, and/or an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $Li(CH_3)_4NBF_4$, $Li(CH_3)_4NBr$, $Li(C_2H_5)_4NClO_4$, $Li(C_2H_5)_4NI$, $Li(C_3H_7)_4NBr$, $Li(n-C_4H_9)_4NClO_4$, $Li(n-C_4H_9)_4NI$, $Li(C_2H_5)_4N$-maleate, $Li(C_2H_5)_4N$-benzoate, $Li(C_2H_5)_4N$-phthalate, lithium stearyl sulfonate, lithium octyl sulfonate, lithium dodecyl benzenesulfonate, and the like. Such an ion salt or ionic compound may be used alone or in a mixture of two or more. The electrolytic salt may include a lithium salt.

The electrolytic salt concentration may be greater than or equal to about 2.0 M (mol/L) and less than or equal to about 5.0 M (mol/L), greater than or equal to about 2.3 M (mol/L) and less than or equal to about 3.0 M (mol/L), or greater than or equal to about 2.5 M (mol/L) and less than or equal to about 2.7 M (mol/L). The electrolytic salt concentration is an electrolytic salt concentration with respect to an entirety of the cyclic carbonate-containing electrolyte solution.

The base solvent is a good solvent with respect to the electrolytic salt and a solubility of the base solvent with respect to the electrolytic salt of greater than or equal to about 100 g at 25° C. The solubility refers to a weight of the electrolytic salt dissolved in 100 g of the solvent. On the other hand, the upper limit of the solubility with respect to the electrolytic salt of the base solvent at 25° C. is not particularly limited, and may be, for example, 400 g.

In addition, the base solvent may include dimethyl carbonate (DMC), ethyl acetate (EA), methyl propionate (MP), and/or methyl acetate (MA).

The cyclic carbonate may include ethylene carbonate (EC), vinylene carbonate (VC), and/or fluoroethylene carbonate (FEC). The cyclic carbonate has high affinity for ionized cations and, particularly, lithium ions in electrolytic salt. In other words, because the lithium ions coordinated with cyclic carbonate move more smoothly than lithium ions coordinated with the base solvent in the electrolyte solution, the conductivity of an electrolyte solution including the cyclic carbonate may be improved.

On the other hand, it may include a poor solvent having a solubility of the cyclic carbonate-containing electrolyte solution with respect to the electrolytic salt at 25° C. being less than or equal to 1 g. In this case, the viscosity of the cyclic carbonate-containing electrolyte solution may be decreased while maintaining the free solvent concentration in the cyclic carbonate-containing electrolyte solution. In addition, the lower limit of the solubility with respect to the electrolytic salt of the poor solvent at 25° C. is not particularly limited, and may be, for example, 0 g.

Specifically, when a poor solvent is added to the cyclic carbonate-containing electrolyte solution, the poor solvent is not dissolved in the cyclic carbonate-containing electrolyte solution but dispersed in the cyclic carbonate-containing electrolyte solution. In other words, the cyclic carbonate-containing electrolyte solution includes the electrolyte solution in which electrolytic salt is dissolved at a high concentration and the poor solvent dispersed in the electrolyte solution. A solvent in the electrolyte solution may be a base solvent and cyclic carbonate. Accordingly, because the electrolytic salt is present at a high concentration in a region of the electrolyte solution, the free solvent (specifically, a free base solvent and free cyclic carbonate) is maintained at a low concentration. The poor solvent may be desirably dispersed in the electrolyte solution and may include, for example, trifluorotoluene ($CF_3Ph$) and/or fluorobenzene (FB).

In addition, the cyclic carbonate-containing electrolyte solution may include various additives. The additives may include a negative electrode-acting additive, a positive electrode-acting additive, an ester-based additive, a carbonate ester-based additive, a sulfuric acid ester-based additive, a phosphoric acid ester-based additive, a boric acid ester-based additive, an acid anhydride additive, an electrolytic additive, and the like. The additives may be used alone or in a mixture of two or more, and a mixing ratio in the case of using a mixture of two or more additives may be appropriately adjusted according to a desired battery performance, which may be widely understood by those skilled in the art.

Method of Manufacturing Rechargeable Lithium Ion Battery

A method of manufacturing the rechargeable lithium ion battery 10 is described. The positive electrode 20 is manufactured as follows. First, a mixture of a positive active material, a conductive agent, and a binder for a positive electrode are dispersed in a solvent (for example, N-methyl-2-pyrrolidone) to prepare slurry. Subsequently, the slurry is coated on a current collector 21 and the same is dried to manufacture a positive active material layer 22. On the other hand, a coating method is not particularly limited. Non-limiting examples of the coating method may be a knife coater method, a gravure coater method, and the like. The below coating process may be performed according to the same method. Subsequently, the positive active material layer 22 is compressed with a press to manufacture a positive electrode 20.

The negative electrode 30 is manufactured according to the same method as that of the positive electrode 20. First, a mixture of a negative active material and a binder for a negative electrode is dispersed in a solvent (for example, water) to prepare slurry. Subsequently, the slurry is coated on the current collector 31 and dried to form a negative active material layer 32. The drying is desirably performed at a temperature of about 150° C. or greater. Then, the negative active material layer 32 is compressed with a press to manufacture a negative electrode 30.

The cyclic carbonate-containing electrolyte solution is, for example, prepared by mixing a base solvent with cyclic carbonate, that is, by dissolving electrolytic salt in the cyclic carbonate-containing solvent. On the other hand, the preparation method of the cyclic carbonate-containing electrolyte solution is not limited thereto but may include the following method. An electrolyte solution is prepared by dissolving electrolytic salt in a base solvent. Then, the cyclic carbonate-containing electrolyte solution may be prepared by adding cyclic carbonate to the electrolyte solution.

Subsequently, the separator 40 is disposed between the positive electrode 20 and the negative electrode 30 to manufacture an electrode structure. Then, the electrode structure is manufactured to have a desired shape (for example, a cylinder, a prism, a laminate, a button, and/or the like) and then inserted into a container having the same shape. Then, the cyclic carbonate-containing electrolyte solution is injected into the container in order to impregnate the electrolyte solution into pores of the separator 40 to manufacture a rechargeable lithium ion battery.

According to the present embodiment, a cycle-life may be improved while maintaining the free solvent concentration in the electrolyte solution at a low level.

EXAMPLES

Example 1

Manufacture of Rechargeable Lithium Ion Battery

Examples of the present embodiment are described. In Example 1, the rechargeable lithium ion battery 10 is manufactured by the following processes.
Manufacture of Positive Electrode As for a positive active material, lithium nickel cobalt oxide represented by $LiNi_{0.88}CO_{0.1}Al_{0.02}O_2$ was prepared. The positive active material, a carbon powder as a conductive agent, and polyvinylidene fluoride as a binder were mixed in a weight ratio of 94:4:2. N-methyl-2-pyrrolidone was added to the mixture and mixed to prepare positive electrode slurry.

Subsequently, the positive electrode slurry was coated to be 222 mm long and 29 mm wide on one surface of a positive current collector including a 12 μm-thick, 238 mm-long, and 29 mm-wide aluminum foil and, in addition, to be 172 mm long and 29 mm wide on the other surface thereof facing oppositely away from the one surface. After coating the positive electrode slurry, the coated positive current collector was dried and compressed to manufacture a positive electrode. The positive electrode had a thickness of 125 μm, and, herein, the positive active material was loaded in an amount of 42.5 mg/cm² with filling density of 3.75 g/cm³ on the positive current collector. Subsequently, another current collector (e.g., an uncoated current collector including a 70 μm-thick, 40 mm-long, and 4 mm-wide aluminum plate) was attached to where the positive active material layer was not formed in the positive electrode.
Manufacture of Negative Electrode As for a negative active material, artificial graphite and silicon-containing carbon were used, and as for a binder, carboxylmethyl cellulose and a styrene butadiene rubber were used. The artificial graphite, the silicon-containing carbon, the carboxylmethyl cellulose, and the styrene butadiene rubber were mixed in a weight ratio of 92.2:5.3:1.0: 1.5, and then the mixture was mixed with water to prepare negative electrode slurry. Subsequently, the negative electrode slurry was coated to be 235 mm long and 30 mm wide on one surface of a negative current collector including an 8 μm-thick, 271 mm-long, and 30 mm-wide aluminum foil and, then, to be 178 mm long and 30 mm wide on the other surface thereof facing oppositely away from the one surface. After coating the negative electrode slurry, the coated negative current collector was dried and compressed to manufacture a negative electrode. The negative electrode had a thickness of 152 μm, and, herein, the negative active material was loaded in an amount of 23.0 mg/cm² with filling density of 1.6 g/cm³ on the negative current collector. Subsequently, a current collector including a 70 μm-thick, 40 mm-long, and 4 mm-wide nickel plate was attached to where the negative active material layer was not formed on the negative current collector.
Manufacture of Cyclic Carbonate-Containing Electrolyte Solution Ethylene carbonate and dimethyl carbonate were mixed in a volume ratio of 10:90 to prepare a cyclic carbonate-containing solvent. Subsequently, LiFSA was dissolved at a concentration of 2.7 M (mol/L) in the cyclic carbonate-containing solvent to prepare a cyclic carbonate-containing electrolyte solution.
Measurement of Raman Spectrum of Cyclic Carbonate-Containing Electrolyte Solution A Raman spectrum of the cyclic carbonate-containing electrolyte solution was measured. The Raman spectrum was measured by using "NRS-4001" (made by JASCO Corporation). The measurement condition was an excitation wavelength of 532 nm, 50 times-magnifying object lens, exposure time of 10 seconds, number of integration of 64, and laser intensity of 5.0 mW. In order to constantly maintain a composition of the cyclic carbonate-containing electrolyte solution during the measurement, the measurement was performed by injecting the cyclic carbonate-containing electrolyte solution into a quartz closed cell in a dry environment at a dew point of −40° C. and, then, sealing the cell.

Subsequently, the obtained Raman spectrum was peak separation-treated. A peak according to an O—$CH_3$ stretching vibration of dimethyl carbonate molecules was found at a different location depending on a state of dimethyl carbonate. As described above, a peak of a free solvent, DMC (so-called free DMC), was found before and after 913 $cm^{-1}$. On the other hand, a peak of a coordinate solvent, DMC (so-called coordinate DMC), was found at greater than or equal to 930 $cm^{-1}$ and less than or equal to 935 $cm^{-1}$. In addition, a small peak of trifluorotoluene was found at 920 $cm^{-1}$. On the other hand, a peak of a free solvent, EC, was found before and after 895 $cm^{-1}$, and a peak of a coordinate solvent, EC, was found before and after 905 $cm^{-1}$. Based on the above observations, a peak was separated by setting a central wavelength at 895 $cm^{-1}$, 905 $cm^{-1}$, 910 $cm^{-1}$, 935 $cm^{-1}$, and 920 $cm^{-1}$. The peak separation was performed by using a spectrum interpretation software, "Spectrum Manager" (made by JASCO Corporation). A ratio of a Lorenz curved line/a Gaussian curved line was randomly set. Thereby, each peak of the free solvent, DMC, the coordinate solvent, DMC, the free solvent, EC, and the coordinate solvent, EC, was specified. Then, a peak area of each peak was calculated. Herein, the peak area indicates an area under a peak separated through the peak separation treatment and a set or predetermined baseline.

Equation 1]

$$A0\_all=\{[A0\_base+Ac\_base)]\times V\_base\times 100\}+ \{[A0\_CC/(A0\_CC+Ac\_CC)]\times V\_CC\times 100\} \quad (1)$$

Subsequently, a peak area ratio of the entire free solvent was calculated according to Equation 1. As a result, the peak area ratio of the entire free solvent was 20%.
Conductivity Next, conductivity of the cyclic carbonate-containing electrolyte solution was measured using the following method. The conductivity was measured by connecting an electric conductivity cell, "CT57101B" (made by DKK-TOA Corporation), to an electric conductivity meter, "CM25R" (made by DKK-TOA Corporation).

The conductivity (mS·cm$^{-1}$) was measured by dipping the electric conductivity cell in 5 mL of an electrolyte solution under a dry atmosphere at a dew point of −40° C. while maintained at a temperature of 23° C.

Viscosity

Next, viscosity of the cyclic carbonate-containing electrolyte solution was measured utilizing the following method. The viscosity was measured by connecting a probe, "PR-110-L" (made by SEKONIC Corp.), to a vibrating viscometer, "Viscomate VM-100A" (made by SEKONIC Corp.). The measurement was performed at 23° C. in a dry environment at a dew point of −40° C. A marked scale was read by dipping the probe in 5 mL of the electrolyte solution. The marked scale in the vibrating viscometer, VM-100A, was (viscosity)×(specific gravity) and thus divided by the measured specific gravity to obtain the viscosity (mPa·s).

Manufacture of Rechargeable Lithium Ion Battery

The positive and negative electrodes and the cyclic carbonate-containing electrolyte solution were used to manufacture a rechargeable lithium ion battery cell. Specifically, a flat electrode assembly was manufactured by interposing a separator between the positive and negative electrodes facing each other and, then, winding and pressing them. As for the separator, two sheets of 350 mm-long and 32 mm-wide polyethylene porous separator were used. Then, the electrode assembly structure was housed in a cell container (e.g., a battery cell container) made of an aluminum laminate, and the cyclic carbonate-containing electrolyte solution was injected thereinto. Herein, each current-collecting tap of the positive and negative electrodes was extended out of the cell container. The manufactured battery (e.g., the battery cell) had a design capacity of 480 mAh.

Evaluation of Cycle-Life Characteristics

A cycle-life of the rechargeable lithium ion battery cell was evaluated using the following method. The rechargeable lithium ion battery cell was charged up to a voltage of 4.3 V at a constant current of 48 mA and, in addition, up to a current of 24 mA at a constant voltage of 4.3 V at 25° C. Subsequently, the rechargeable lithium ion battery cell was discharged down to a voltage of 2.8 V at a current of 48 mA. Herein, discharge capacity of the rechargeable lithium ion battery cell was measured as initial discharge capacity (Q1).

Subsequently, the initially charged and discharged rechargeable lithium ion battery cell was charged and discharged at 25° C. as follows. The rechargeable lithium ion battery cell was charged up to a voltage of 4.3 V at a constant current of 240 mA and, in addition, up to a current of 24 mA at a constant voltage of 4.3 V. Then, the rechargeable lithium ion battery cell was discharged down to a voltage of 2.8 V at a current of 240 mA. This charge and discharge as one cycle were repeated 50 times. Herein, discharge capacity of the rechargeable lithium ion battery cell at the 50$^{th}$ cycle (Q50[0.5C]) was measured and divided by the initial capacity (Q1) to obtain capacity retention (%).

Example 2

A rechargeable lithium ion battery cell was manufactured according to the same method as Example 1, except that the cyclic carbonate-containing solvent was prepared by mixing the ethylene carbonate and the dimethyl carbonate in a volume ratio of 12:88.

Example 3

A rechargeable lithium ion battery cell was manufactured according to the same method as Example 1, except that the cyclic carbonate-containing solvent was prepared by mixing the ethylene carbonate and the dimethyl carbonate in a volume ratio of 5:95.

Example 4

A rechargeable lithium ion battery cell was manufactured according to the same method as Example 1, except that the cyclic carbonate-containing solvent was prepared by mixing the ethylene carbonate and the dimethyl carbonate in a volume ratio of 3:97.

Example 5

A rechargeable lithium ion battery cell was manufactured according to the same method as Example 1, except that LiFSA was used at a concentration of 3.9 M (mol/L).

Example 6

A rechargeable lithium ion battery cell was manufactured according to the same method as Example 1, except that trifluorotoluene was put in the cyclic carbonate-containing electrolyte solution according to Example 1. Herein, the cyclic carbonate electrolyte solution according to Example 1 and trifluorotoluene were used in a volume ratio of 90:10.

Example 7

A rechargeable lithium ion battery cell was manufactured according to the same method as Example 1, except that trifluorotoluene was put in the cyclic carbonate-containing electrolyte solution according to Example 5. Herein, the cyclic carbonate electrolyte solution according to Example 5 and the trifluorotoluene were used in a volume ratio of 80:20.

Comparative Example 1

A rechargeable lithium ion battery cell was manufactured according to the same method as Example 1, except that an electrolyte solution was prepared by mixing ethylene carbonate and dimethyl carbonate in a volume ratio of 0:100 (i.e., no use of the ethylene carbonate).

Comparative Example 2

A rechargeable lithium ion battery cell was manufactured according to the same method as Example 1, except that the cyclic carbonate-containing electrolyte solution was prepared by mixing ethylene carbonate and dimethyl carbonate in a volume ratio of 16:84.

Comparative Example 3

A rechargeable lithium ion battery cell was manufactured according to the same method as Example 1, except that LiFSA was used at a concentration of 4.6 M (mol/L).

Comparative Example 4

A rechargeable lithium ion battery cell was manufactured according to the same method as Example 5, except that the electrolyte solution was prepared by mixing ethylene carbonate and dimethyl carbonate in a volume ratio of 0:100 (i.e., no use of the ethylene carbonate).

TABLE 1

|  | Area ratio of entire free solvent (%) | Li salt concentration (M (mol/L)) | Volume ratio of EC (volume %) | Conductivity (mS · cm$^{-1}$) | Viscosity (mPa · s) | Capacity retention (%) |
| --- | --- | --- | --- | --- | --- | --- |
| Example 1 | 20 | 2.7 | 10 | 7.0 | 12 | 90 |
| Example 2 | 20 | 2.7 | 12 | 7.0 | 13 | 80 |
| Example 3 | 20 | 2.7 | 5 | 6.9 | 11 | 88 |
| Example 4 | 20 | 2.7 | 3 | 6.9 | 10 | 85 |
| Example 5 | 3 | 3.9 | 10 | 3.4 | 45 | 82 |
| Example 6 | 20 | 2.5 | 10 | 7.2 | 8 | 93 |
| Example 7 | 3 | 3.2 | 10 | 4.0 | 25 | 83 |
| Comparative Example 1 | 20 | 2.7 | 0 | 6.5 | 10 | 75 |
| Comparative Example 2 | 20 | 2.7 | 16 | 7.0 | 15 | 77 |
| Comparative Example 3 | 0 | 4.6 | 10 | 1.5 | 120 | 70 |
| Comparative Example 4 | 3 | 3.9 | 0 | 3.1 | 42 | 79 |

Referring to Table 1, the [Li salt concentratior] was a concentration of Li salt based on an entire volume of the cyclic carbonate-containing electrolyte solution, and the [a volume ratio of EC] was a ratio (volume %) of EC based on an entire volume of the ethylene carbonate and the dimethyl carbonate. Examples 1 to 7 all showed increased conductivity and capacity retention. Particularly, when the Li salt concentration was in a range of greater than or equal to 2.3 M (mol/L) and less than or equal to 3.0 M (mol/L), for example, greater than or equal to 2.5 M (mol/L) and less than or equal to 2.7 M (mol/L), the capacity retention was greater than or equal to 85%. On the other hand, Examples 5 and 7 showed low conductivity compared with the other Examples or a part of Comparative Examples, but the reason for this is that the electrolytic salt was at a high concentration. Examples 5 and 7 each showed higher conductivity than Comparative Example 4, having an equivalent Li salt concentration thereto. In addition, Examples 5 and 7 each showed much improved capacity retention compared with each of Comparative Examples 1 to 4. On the other hand, Comparative Examples 1 to 4 each showed no sufficient improved results. Comparative Example 1 used a desired Li salt concentration but no ethylene carbonate and thus showed deteriorated conductivity and, further, deteriorated capacity retention. In contrast, Comparative Example 2 used a desired Li salt concentration but an extreme amount of ethylene carbonate and thus showed increased viscosity and thus deteriorated capacity retention. Comparative Example 3 used an extremely high Li salt concentration and thus showed deteriorated conductivity and increased viscosity and thus deteriorated capacity retention. Comparative Example 4 used no ethylene carbonate and thus showed deteriorated conductivity and deteriorated capacity retention.

The terminology used herein is for the purpose of describing particular embodiments only and is not intended to be limiting of the inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept."

As used herein, the terms "substantially," "about," and similar terms are used as terms of approximation and not as terms of degree, and are intended to account for the inherent deviations in measured or calculated values that would be recognized by those of ordinary skill in the art.

As used herein, the term "major component" refers to a component that is present in a composition, polymer, or product in an amount greater than an amount of any other single component in the composition or product. In contrast, the term "primary component" refers to a component that makes up at least 50% (wt % or at %) or more of the composition, polymer, or product.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As described above, while the present invention has been particularly shown and described with reference to desirable embodiments thereof, it is to be understood that the invention is not limited to the disclosed embodiments. It will be understood by those of ordinary skill in the art that various modifications and equivalent arrangements may be made therein without departing from the spirit and scope of the invention as defined by the appended claims, and equivalents thereof.

For example, in the above embodiment, the present invention is applied to a rechargeable lithium ion battery. However, the present invention may also be applied to other types of non-aqueous electrolyte rechargeable batteries.

DESCRIPTION OF SYMBOLS

10: rechargeable lithium ion battery
20: positive electrode
21: positive current collector
22: positive active material layer
30: negative electrode
31: negative current collector
32: negative active material layer
40: separator

What is claimed is:

1. A non-aqueous electrolyte solution for a rechargeable battery, comprising:
    an electrolytic salt having a concentration of greater than or equal to about 2.0 M (mol/L) and less than or equal to about 5.0 M (mol/L) with respect to the electrolyte solution;
    a cyclic carbonate-containing solvent; and
    a poor solvent,
    wherein the poor solvent has a solubility with respect to the electrolytic salt of less than or equal to about 1 g, and comprises at least one selected from trifluorotoluene ($CF_3Ph$) and fluorobenzene (FB),
    wherein:
    the cyclic carbonate-containing solvent comprises a base solvent and a cyclic carbonate;
    the cyclic carbonate is included in an amount of about 1 volume % to about 15 volume % based on a total volume of the base solvent and the cyclic carbonate;
    the cyclic carbonate-containing solvent comprises a coordination solvent coordinated with an ionized ion from the electrolytic salt and a free solvent not coordinated with an ionized ion from the electrolytic salt; and
    a peak area ratio of the free solvent determined by a Raman spectrum is greater than or equal to about 1% and less than or equal to about 25%.

2. The non-aqueous electrolyte solution of claim 1, wherein the electrolytic salt has a concentration of greater than or equal to about 2.3 M (mol/L) and less than or equal to about 3.0 M (mol/L).

3. The non-aqueous electrolyte solution of claim 1, wherein the cyclic carbonate comprises at least one selected from ethylene carbonate (EC), vinylene carbonate (VC), and fluoroethylene carbonate (FEC).

4. The non-aqueous electrolyte solution of claim 1, wherein the electrolytic salt comprises a lithium salt.

5. The non-aqueous electrolyte solution of claim 1, wherein the peak area ratio of the free solvent is greater than or equal to about 3% and less than or equal to about 20%.

6. A rechargeable battery, comprising:
    the non-aqueous electrolyte solution of claim 1.

7. The rechargeable battery of claim 6, wherein the electrolytic salt has a concentration of greater than or equal to about 2.3 M (mol/L) and less than or equal to about 3.0 M (mol/L).

8. The rechargeable battery of claim 6, wherein the cyclic carbonate comprises at least one selected from ethylene carbonate (EC), vinylene carbonate (VC), and fluoroethylene carbonate (FEC).

9. The rechargeable battery of claim 6, wherein the electrolytic salt comprises a lithium salt.

10. The rechargeable battery of claim 6, wherein the peak area ratio of the free solvent is greater than or equal to about 3% and less than or equal to about 20%.

11. A method of manufacturing a rechargeable battery, comprising:
    providing the non-aqueous electrolyte solution of claim 1 to an electrode assembly of the rechargeable battery.

* * * * *